United States Patent [19]
Edling et al.

[11] Patent Number: 5,191,875
[45] Date of Patent: Mar. 9, 1993

[54] HIGH EFFICIENCY SOLAR BOILER

[76] Inventors: Jack V. Edling, 2116 Camino Dr., Escondido, Calif. 92026; Dale G. Hamreus, Rt. 1 Box 199, Long Beach, Wash. 98631

[21] Appl. No.: 766,513

[22] Filed: Sep. 27, 1991

[51] Int. Cl.⁵ .............................................. F24J 2/38
[52] U.S. Cl. ............................ 126/576; 126/663; 126/698; 126/706; 126/570
[58] Field of Search ............ 126/425, 440, 424, 448, 126/450, 418; 250/491.1, 203.1, 203.3, 203.4

[56] References Cited

U.S. PATENT DOCUMENTS

| | | | |
|---|---|---|---|
| 3,915,148 | 10/1975 | Fletcher et al. | 126/440 X |
| 3,937,208 | 2/1976 | Katz et al. | 126/450 |
| 3,943,911 | 3/1976 | Yu | 126/450 |
| 3,981,295 | 9/1976 | Minnick | 126/440 X |
| 3,991,741 | 11/1976 | Northrup, Jr. et al. | 126/425 |
| 4,082,947 | 4/1978 | Haywood et al. | 126/425 X |
| 4,109,640 | 8/1978 | Smith | 126/425 |
| 4,137,899 | 2/1979 | Weslow | 126/440 |
| 4,171,695 | 10/1979 | Sletton | 126/440 X |
| 4,179,612 | 12/1979 | Smith | 126/425 X |
| 4,191,168 | 3/1980 | Allen et al. | 126/417 X |
| 4,217,884 | 8/1980 | Strong | 126/425 X |
| 4,225,781 | 9/1980 | Hammons | 126/425 X |
| 4,300,531 | 11/1981 | Raetz | 126/417 |
| 4,307,711 | 12/1981 | Doundoulakis | 126/440 X |
| 4,320,288 | 3/1982 | Schlarlack | 126/425 |
| 4,345,587 | 8/1982 | Carvalho | 126/417 |
| 4,649,899 | 3/1987 | Moore | 126/425 |
| 4,769,531 | 9/1988 | Malek | 126/425 X |

Primary Examiner—Larry Jones
Attorney, Agent, or Firm—Frank D. Gilliam

[57] ABSTRACT

A solar boiler of improved energy efficiency that includes a solar panel for receiving solar energy and converting a liquid to steam and a highly accurate tracking system to maintain the panel substantially perpendicular to the sun. The panel includes a plurality of heat transfer liquid carrying tubes having a highly absorptive coating over areas receiving solar energy and high efficiency insulating material over remaining surface areas. An extruded compound concentrating cylindrical lens is positioned over each tube to concentrate received solar energy along a narrow linear energy receiving area. Each panel is mounted for rotation and tilting on a simple, sturdy base. Each panel is substantially closed but includes openings designed so that some air flow through the panel is permitted to prevent excessive heat within the panel while preventing entry of moisture. A tracking system capable of tracking with accuracy of substantially one-half degree or better is provided, utilizing an improved sensor and electronic circuit. A device utilizing the steam produced in the panel, such as a fluid driven engine powered electrical generator, may be positioned closely adjacent to the tubes to receive steam from the tubes.

37 Claims, 6 Drawing Sheets

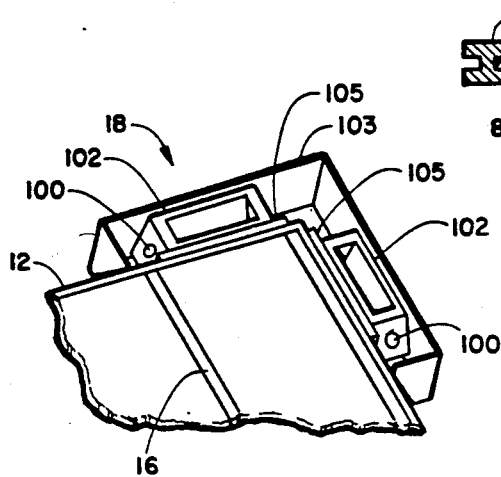
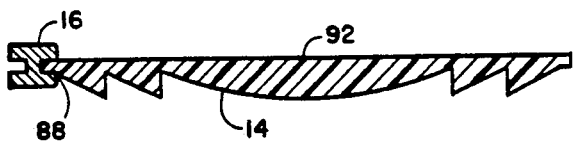
FIGURE 2
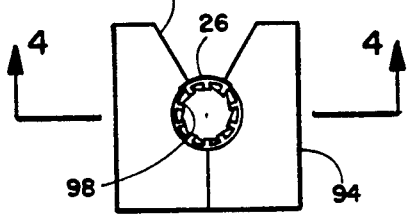
FIGURE 3
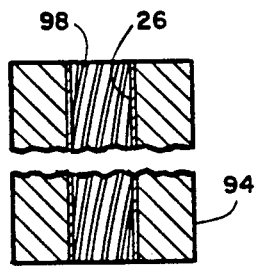
FIGURE 4
FIGURE 7
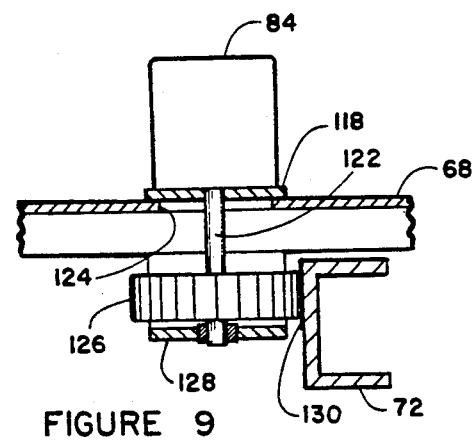
FIGURE 9
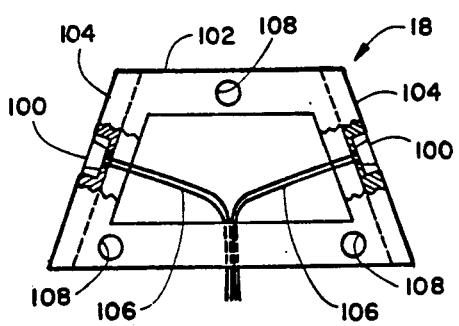
FIGURE 5
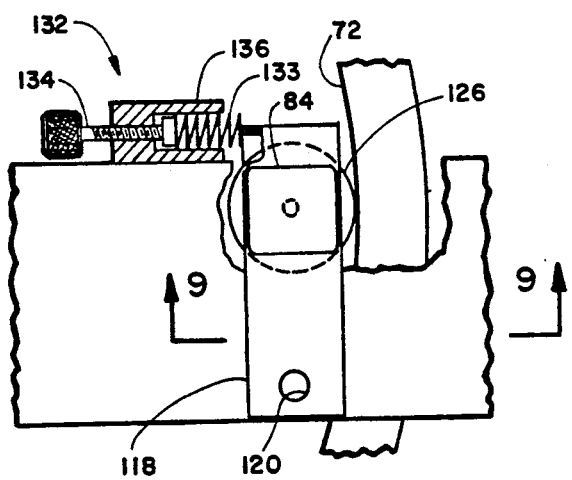
FIGURE 8
FIGURE 6

HIGH EFFICIENCY SOLAR BOILER

BACKGROUND OF THE INVENTION

This invention relates in general to devices for collecting solar energy and putting the collected energy to use and, more specifically, to a high efficiency solar panel for producing high pressure, super heated steam in a boiler heated by collected solar energy.

A great many different devices have been developed for collecting energy from the sun and using the collected energy to perform useful work. These vary from very simple, low efficiency passive devices to very complex devices for special purposes. Some merely collect heat energy in a liquid and direct it to a location which is to be heated. Photovoltaic cells convert the sun's energy directly to direct current electricity, generally with rather low energy conversion efficiency.

Simple passive devices using dark-colored tubes exposed to the sun through which water is flowed are often useful in heating swimming pools and the like. Typical of these passive systems is that described by Moseley in U.S. Pat. No. 2,608,968. These systems, although inexpensive, have low energy conversion efficiency and are not useful for purposes requiring high energy density, such as the generation of steam to, for example, drive electrical generators.

Other systems use very large arrays of reflectors to reflect solar energy to a small central energy absorber and boiler, such as is shown by Clark in U.S. Pat. No. 4,196,289. These systems require a large number of reflectors, each having a mechanism to keep the reflector at the proper angle to the sun and the central absorber. These tend to be very complex and expensive and require large areas for the assembly. Typically, these systems have a large number of reflectors arrayed across the ground, reflecting energy to a boiler mounted at the top of a tower at the center of the reflector field.

In order to improve efficiency, some solar energy systems use lenses or parabolic reflectors to concentrate energy received over a large area to a small absorber, typically a tube carrying a liquid such as water. Typical of these are the complex lens systems of Doundoulakis (U.S. Pat. No. 4,307,711) which focus energy from a large area onto a series of points along a tube. The complex lens must be very precisely made and carefully adjusted to accomplish reasonably high accuracy. Weslow in U.S. Pat. 4,137,899 attempts to accomplish similar concentration using a very large number of condensing lens embedded in a plastic sheet. A cylindrical lens or linear parabolic reflector is proposed by Holt in U.S. Pat. No. 4,058,110 to concentrate solar energy onto a line along a tube. These systems when exposed to the atmosphere quickly become degraded by dust or rain residue and require frequent cleaning due to the trough-like shapes used.

While many solar energy collectors are fixed in one position, such as on the surface of a south facing house roof, others are adjustable to allow orientation toward the sun and some have mechanically or electronically controlled tracking systems to follow the sun over the day. Typical of these is the system disclosed by Hammons in U.S. Pat. No. 4,225,781 which uses a plurality of photocells on and around a shade horn support so that as the position of the sun varies, different photo cells will be shadowed and the resulting change in cell output can direct a motor to move the collector appropriately. Others, such as Smith in U.S. Pat. No. 4,179,612 use dividers between a plurality of photo cells so that the dividers shadow certain cells as the relative position of the sun changes. Moving means moves the collectors in accordance with the varying photo cell output. While somewhat effective, these systems are not capable of consistently pointing the collector within about $\frac{1}{2}°$ (the diameter of the sun as viewed from the earth) and so produce lower energy collection efficiency.

Thus, there is a continuing need for improvements in devices for the collection and utilization of solar energy. Improvements in system accuracy and reliability are needed, as are improvements in the collection and transfer of energy to improve the percentage of the incident energy that reaches the final work producing output device, such as a steam driven electric generator. Also, the efficiency of the output device in producing maximum work in proportion to the received energy needs improvement.

SUMMARY OF THE INVENTION

It is, therefore, an object of this invention to provide a solar energy collection and utilization system of improved reliability and efficiency. Another object is to provide a system having an improved high pressure, superheated steam, boiler. Another object is to provide a system in which a higher percentage of the incident solar energy is transferred to a working liquid. A further object is to provide a system having a liquid tube which absorbs and retains a higher percentage of the incident solar energy and transfers a higher percentage of that energy to the working liquid. Yet another object is to provide a system having an improved means for condensing solar energy falling on a wide area onto a narrow line on a liquid filled tube. Still another object is to provide a system having improved sun tracking accuracy and reliability.

The above-noted objects, and others, are accomplished in accordance with this invention by a system that basically comprises a panel including an improved lens system for collecting solar energy in a liquid in a tube system and boiling that liquid, a highly accurate, high reliability, electronic tracking system to assure that the panel is perpendicular to the sun within about $\frac{1}{2}°$.

The solar panel basically comprises a large flat pan that houses a grid of substantially parallel liquid conveying tubes which are thermally insulated except along a top strip, where the focal line lies. The efficiency of the system is such that a liquid, such as water, enters the tubes, boils in the tubes and exits as high pressure superheated steam. The top of the pan is closed by a cover which includes a plurality of parallel compound concentrating cylindrical lens which have a flat surface at the top of the cover and multiple cylindrical inner surfaces. Moisture traps are provided to permit air circulation through the panel while preventing entry of any moisture into the panel.

The solar panel is mounted on a simple, sturdy mechanism which allows the panel to be rotated and tilted to follow the sun. Photo cells in a unique sensor configuration determine the angle of the panel surface to the sun and cause a panel drive means to move the panel to assure that the panel is perpendicular to the sun within about one-half degree. The heated fluid (which could at this point be a superheated liquid or steam) is directed to a device to make use of the heat content of the fluid such as a fluid engine to operate an electrical generator.

BRIEF DESCRIPTION OF THE DRAWING

Details of the invention, and of preferred embodiments thereof, will be further understood upon reference to the drawing, wherein:

FIG. 2 is a transverse section view through a compound concentrating cylindrical lens;

FIG. 3 is a transverse section view through a liquid conveying tube and associated insulation;

FIG. 4 is an axial section view through the tube and insulation, taken on line 4—4 in FIG. 3;

FIG. 5 is an elevation view, partially cut away, of a sun sensor;

FIG. 6 is a section through a water trap assembly, taken substantially on line 6—6 in FIG. 1;

FIG. 7 is a schematic perspective view of an assembly of the sun sensors shown in FIG. 5;

FIG. 8 is a detail plan view, partially cut away, showing the mechanism for rotating the solar panel;

FIG. 9 is a schematic section view showing the mechanism for rotating the solar panel, taken on line 9—9 in FIG. 8

DETAILED DESCRIPTION OF PREFERRED EMBODIMENTS

Figure 1:
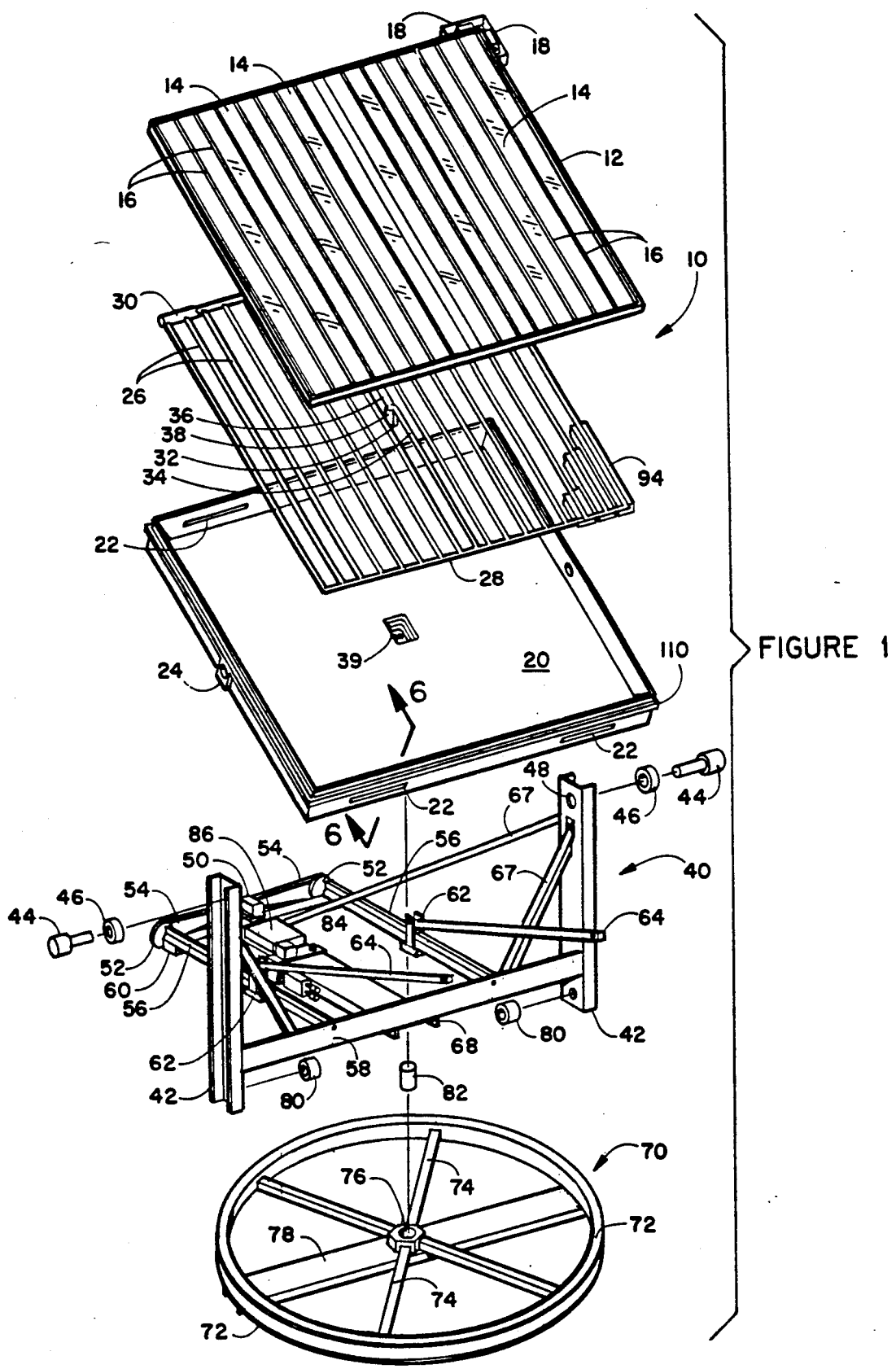
FIG. 1 is an exploded, partially cut-away, view of the solar panel and tracking mechanism.

Referring now to FIG. 1, there is seen an exploded view, partially cut away, of the solar panel and tracking assembly of this invention.

The solar panel 10 basically comprises a lens grid support frame 12, typically formed from extruded aluminum strips, channel or the like. A plurality of compound concentrating cylindrical lens 14 extends in a parallel relationship across frame 12. Lens 14 are very conveniently and economically made by an extrusion process. The edges of lens 14 are supported by metal strips 16 extending across frame 12 and overlapping the lens edges. Typically, strips could be aluminum extrusions with two opposed channels, in an "H" shape, so that adjacent edges of lenses can extend into the channels of the "H" and be easily and uniformly supported. If desired, lens 14 could be fastened to strips 16, such as by adhesive bonding.

Sun sensors 18, as described in detail below, can be conveniently mounted at an upper corner of frame 12. Preferably, sensors 18 are mounted at the upper right hand corner of frame 12 for use in the Northern Hemisphere and at the upper left hand corner for use in the Southern Hemisphere. Typically, sensors 18 can have the altitude half of the sensor assembly mounted on the side of frame 12 and the azimuth half along the top edge of the frame, as viewed from the sun side of the frame.

Frame 12 is removably mounted at the top of a pan 20, with the frame closing the pan. Pan 20 is typically formed from aluminum. Water and air traps 22 (as detailed below) are provided in the upper and lower walls of pan 20. Traps 22 permit air flow through pan 20 to prevent excessively high temperatures from developing in the pan while preventing entry of any water into the pan. Bearings 24 are provided at the center of the sidewalls of pan 20 for connection of the mechanism for tilting solar panel 10, as described below.

Between the bottom of pan 20 and the assembly of lenses 14 is positioned a grid of heat collector tubes 26. Tubes 26 are connected to a water manifold 28 at their lower ends and to a steam manifold 30 at their upper ends. A liquid to be heated enters the system through a flexible fitting 32 and pipe 34 to water manifold 28. Any suitable liquid may be used, such as water, a water-alcohol mixture or the like. For convenience, the liquid will be referred to in this specification as water, although other liquids could be used. Heated liquid or steam exits the system through a pipe 36 and a flexible fitting 38. Fittings 32 and 38 have sufficient flexibility to permit solar panel 10 to be tilted in azimuth during sun tracking. Typically, fittings 32 and 38 could be formed from flexible steam tube, have conventional universal joints or other suitable mechanisms ensuring flexibility and resistance to leakage. Since fittings 32 and 38 are positioned on the tilting axis, only limited flexibility is required. Fittings 32 and 38 pass through an opening 39 in pan 20. Preferably, a flexible rubber sleeve fills the space between opening 39 and fittings 32 and 38. Steam manifold 30 and the steam flexible fitting 38 are heavily insulated to prevent heat loss.

Solar panel 10 is mounted on a support structure 40 having a yoke 42 formed by upright beams. Pins 44 extend through bushings 46 and holes 48 in yoke 42 into bearings 24 to support panel 10 while permitting the panel to tilt to track the altitude of the sun. Attitudinal movement is powered by a two directional electrical servo motor 50 which rotates a pair of pulleys 52 through belts 54. Pulleys 52 directly drive two screw drive assemblies 56 that are supported by crossbars 58 and 60. Brackets 62 threaded onto screws 56 are moved along screws 56 as the screws are rotated in one direction or the other. Connecting rods 64 extend from brackets 62 to conventional pivots (not shown) on the underside of pan 20 near the lower edge thereof. Thus, as brackets 62 are moved back and forth, panel 10 tilts correspondingly to orient the panel to the correct altitude for the location of the sun as sensed by sensors 18.

The support structure 40, including yoke 42, crossbars 58 and 60, various braces 67 and channel 68 is mounted for rotation on a circular base 70. Base is wheel-like, with a rim 72, spokes 74, a hub 76 and a reinforcing bar 78. Base 70 is connected to channel 68 through a pin 82 that extends from hub 76 into a bearing (see drawing FIG. 9 for details) in channel 68 near crossbar 58, so that support structure 40 is rotatable relative to base 70. Wheels 80 are rotatably secured to the lower ends of yoke 42 and below channel 68 (not seen), spaced to ride on rim 72. The azimuthal movement of the solar panel 10 is powered by a two directional electrical servo motor 84 mounted on channel 68 and having a conventional rubber tired drive wheel (see drawing FIGS. 8 and 9) in driving engagement with rim 72. Bar 78 and spokes 74 serve both to prevent rim 72 from deforming out of round and provide attachment members for bolts or the like used to secure the entire assembly to posts, a roof or platform, etc.

In operation, signals from sensors 18 are processed in electronic circuitry located in box 86 and servo motors 50 and 84 are caused to operate to move panel 10 to a position perpendicular to the direction of the sun.

Details of the extruded compound concentrating cylindrical lens strips 14 are shown in a transverse section in FIG. 2. The center segment of the lens 14 and the outer segments have different length radii, receiving sunlight over the full width of the lens and focussing it as a narrow line (typically having a width of about 0.05 to 0.075 inch) along a tube 26. Typically, the lens 14 making up the lens array supported by thin edges 88 that fit in "H" shaped aluminum extrusions 16. The top or outside surface 92 is flat and easily cleaned of dirt or other material that would interfere with maximum light transmission through the lens. Lens 14 are easily formed by extrusion of a suitable transparent plastic material, such as an acrylic resin, to inexpensively produce very accurate lenses.

FIGS. 3 and 4 show tubes 26 and associated thermal insulation 94 in greater detail. Each tube 26 is almost entirely surrounded by a thick layer of ceramic insulation material 94 having superior thermal insulating characteristics. A linear gap 96 in insulation 94 is provided along the side towards lenses 14 to receive the focused or concentrated sunlight focussed along a line within gap 96. Typical of these insulating materials is asbestos free ceramic fiber board available from Cotronics Corporation of New York. While tube 26 may be formed from any suitable material, copper is preferred because of its excellent thermal conductivity. The surface of tube 26 exposed in gap 96 is dull black in color to maximize light absorption and minimize waste through reflection. For optimum results, a black chrome coating should be used on tube 26 within gap 96. A preferred black coating includes an ultra flat black coating readily available at paint stores.

To increase heat transfer efficiency from tube 26 to the fluid within the tube, the tube should have raised interior ridges 98, preferably in a spiral pattern. Ridges 98 provide greater surface area on the interior surface than on the exterior surface of the tube, increasing heat transfer and they provide a mixing or swirling liquid flow, preventing stagnation along the interior walls to further increase heat transfer efficiency. For best results, ridges 96 are rectangular in cross section, provide an interior surface area about 2.6 times the surface of the exterior of the tube and spiral in a counter clockwise direction about one complete revolution every 3 inches.

FIG. 5 shows in side view details of a sensor assembly 18 which could be either the altitude or azimuth sensor. When sensor assembly 18 is properly aligned perpendicular to the direction of the sun, photocells 100 on opposite angled sides of housing 102 will be precisely equally exposed to the sun. The angle of the planes on both sides 104 are equal. Best results are obtained where sides 104 are at angles of about 21.5° to the vertical line perpendicular to the plane of panel 10.

When the housing is tilted relative to the sun, the cell on one side will receive less sunlight and produce a reduced voltage while the cell on the other side will produce an increased voltage. This arrangement will produce a much greater voltage differential than systems which merely increasingly shadow some photocells without increasing exposure of the opposite cells.

The two leads 106 are twisted together and are directly connected to the electronic tracking control circuitry contained in box 86 (FIG. 1). Housing 102 is bolted through holes 108 and bolted to the upper edge of pan 20 for azimuth control and to the upper side edge of pan 20 for altitude control. Because the light sensitive material used in photocell production is generally limited in the amount of heat it can tolerate before it becomes unstable (often about 75° C.) the control circuit of this invention limits the amount of heat produced in the cells by the circuit to less than about 1° C. In order to reduce heat build-up from both electrical and ambient sources, housing 102 preferably contains openings in the top and bottom to allow air circulation around the bases of photo cells 100 and insulation is provided between housing 102 and frame 12.

When panel 10 is aligned perpendicular to the direction of the sun, both photocells 100 in each pair will be precisely equally exposed to the sun. As the sun moves relative to panel 10, one of each pair of photocells becomes exposed to the sun to a slightly greater extent than the other, upsetting the balance of resistance in the photocells, causing an unbalanced signal going to the tracking circuitry, which then moves the panel until balance is again achieved. Details of the tracking system are provided in the discussion of FIGS. 10 and 11, below.

Details of the air and water trap 22 is provided in FIG. 6, which is a detail section view taken on line 6—6 in FIG. 1. The side walls of pan 20 include a box section reinforcement 110 extending around the pan near the upper outside edge of the side walls. A small section 112 of the sidewall is cut away and the upper edge of the cutout is bent down at about a 45° angle, as shown. A metal strip 114 is secured to box section reinforcement 110 and extends loosely over the cut out section, with a lower edge bent inwardly below section 112. This prevents rain water or the like from entering panel 10 while permitting limited air flow through the panel.

FIG. 7 is a perspective detail view showing the sun sensor assembly 18, which includes two of the assemblies shown in FIG. 5. Two housings 102 are provided, one along each edge of frame 12 at the corner of the frame so that the housings are perpendicular to each other. An enclosure 103 surrounds sensors 102, leaving the top surfaces open. Sensors 102 are mounted to frame 12 by bolts through holes 108 (as shown in FIG. 5). A pad of thermally insulating material 105 is preferably placed between sensors 102 and frame 12 to limit heat transfer. Each sensor 18 has a large central cavity through which air can easily move to aid in cooling the assembly and the photocells. The relative exposure of photocells 100 on each sensor changes as the sun moves in both an up/down direction and east/west direction during the day.

Details of the drive means driven by motor 84 (as seen in FIG. 1) for rotating the solar panel 10 in a horizontal plane is provided in FIGS. 8 and 9. FIG. 9 is a plan view, showing the area of channel 68 on which motor 84 is mounted in FIG. 1. Motor 84 is mounted on a bar 118 that is pivoted for rotation about a point 120. The shaft 122 of motor 84 extends down through an opening 124 in channel 68 adjacent to the inner rim 72 of base 70. A wheel 126 is mounted on shaft 122 in driving engagement to rim 72. A retainer 128 extends down from the free end of bar 118 to hold the end of shaft 122 in the desired alignment. A high friction layer 130 may be provided on the surface of rim 72 engaged by wheel 126 to reduced friction. Both wheel 126 and layer may be formed from a rubbery, high friction material. An adjustable spring assembly 132 having a spring 133 pressing against the free end of bar 118 is provided to permit the pressure of wheel 126 against rim 72 to be adjusted by manually threading rod 134 in or out of spring housing 136.

Figure 10:
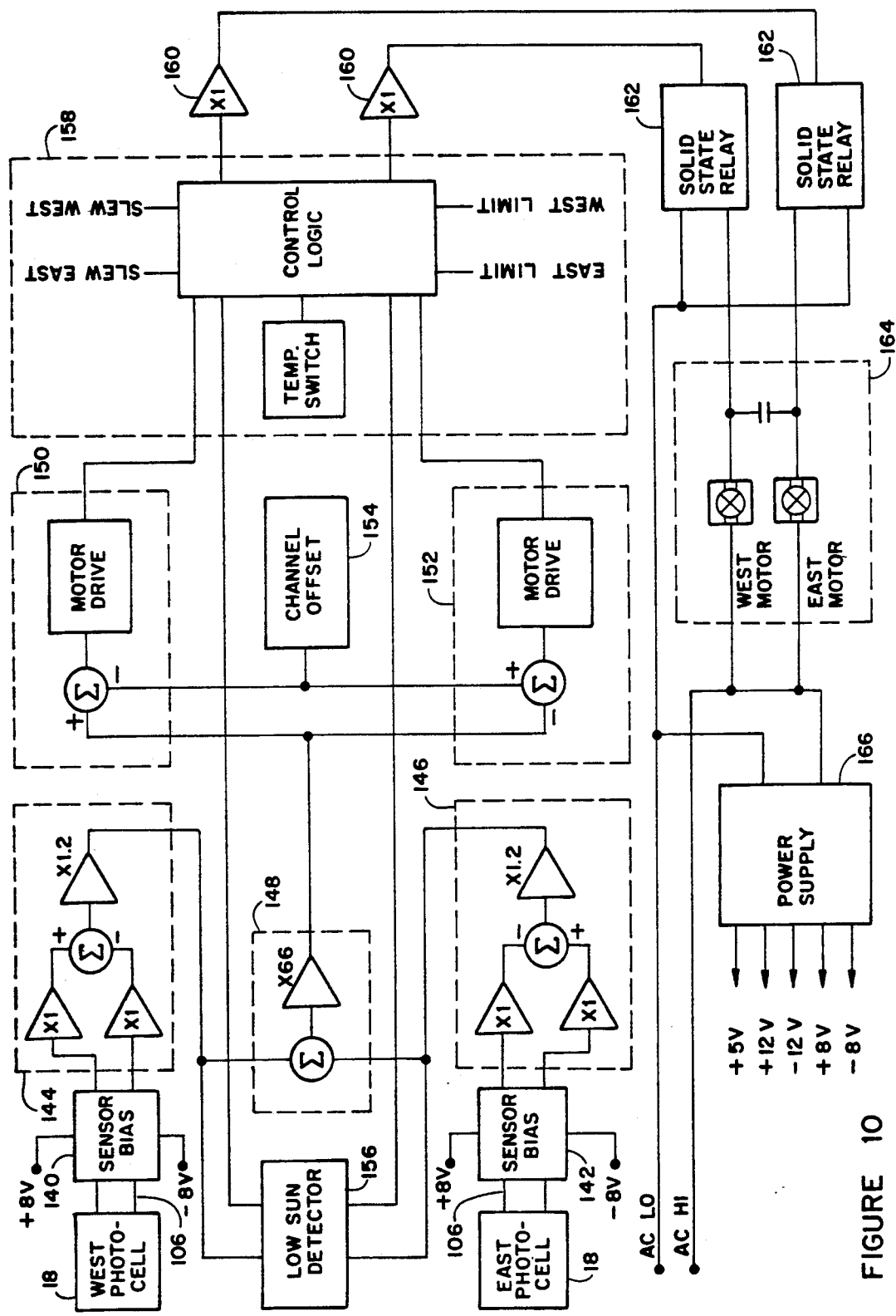
FIG. 10 is a block diagram of the panel control and tracking system.

A block diagram of the electronic tracking system is schematically shown in FIG. 10. The system is a precise, rugged and reliable circuit that provides tracking with a high degree of accuracy, with the capability of staying within one-half degree or less of the width of the sun both in altitude and azimuth. The circuit is responsive to the balanced/imbalanced condition of voltages present at the terminals of each of the azimuthal and attitudinal pairs of photocells 100.

The pointing system is of the on-off type with hysterisis. It is designed to point directly at the sun with a small offset angle of plus or minus theta. The sun then moves from a minus theta angle to an offset angle equal to plus theta. At this point the controller turns on and drives the solar panel 10 back to the minus theta position and shuts off and the cycle is repeated as necessary. The angle theta is adjustable and can be made very small, less than one half degree, resulting in a very sensitive pointing device. The effect of this very sensitive responsiveness is to keep the focal line of the sun's rays squarely on tube 26, which has a preferred focussed width of about 0.05 inch within a gap 46 that is approximately 0.15 inch wide.

Figure 11A:
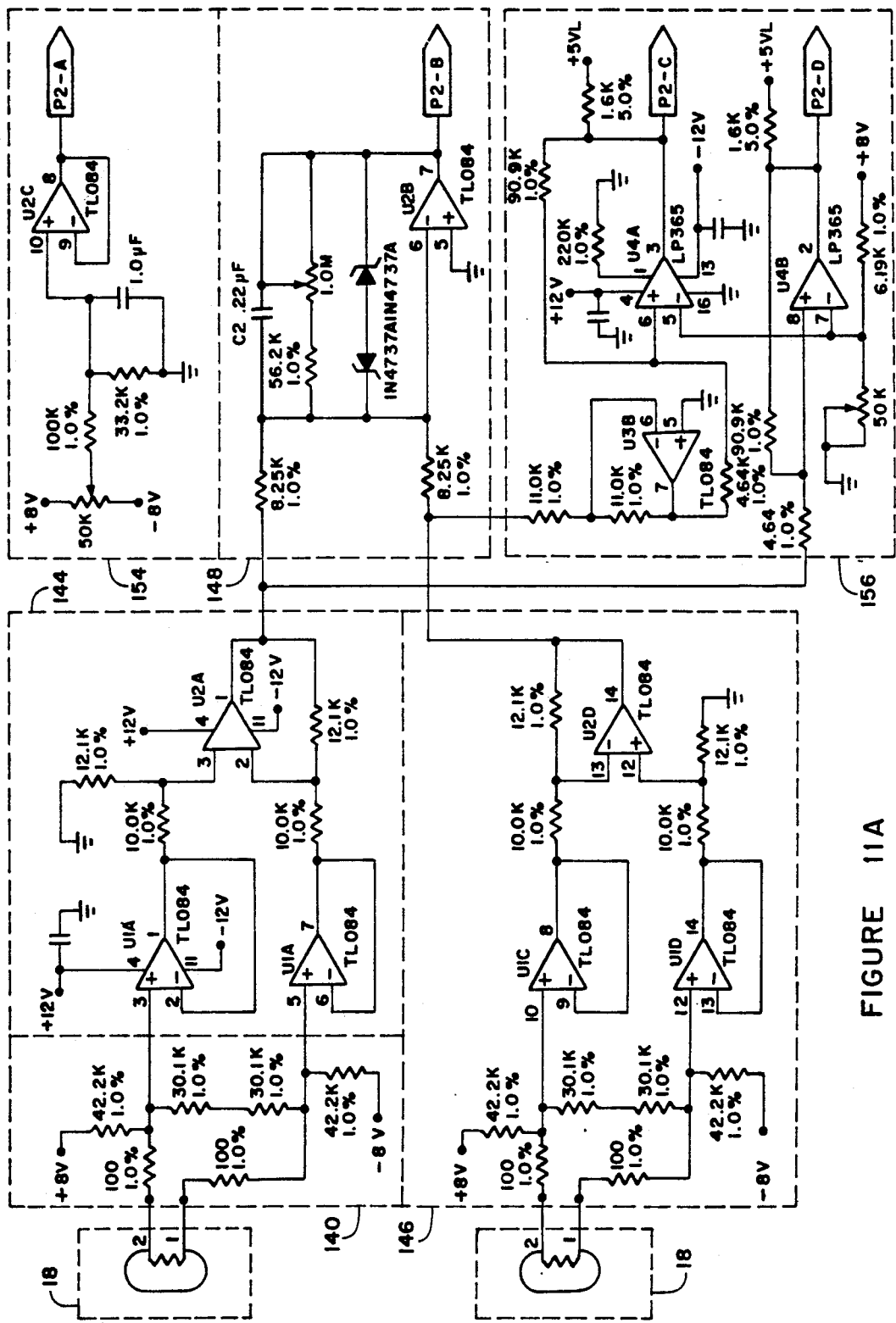
FIGS. 11A through 11C together make up a circuit diagram for the solar panel tracking system.
Figure 11B:
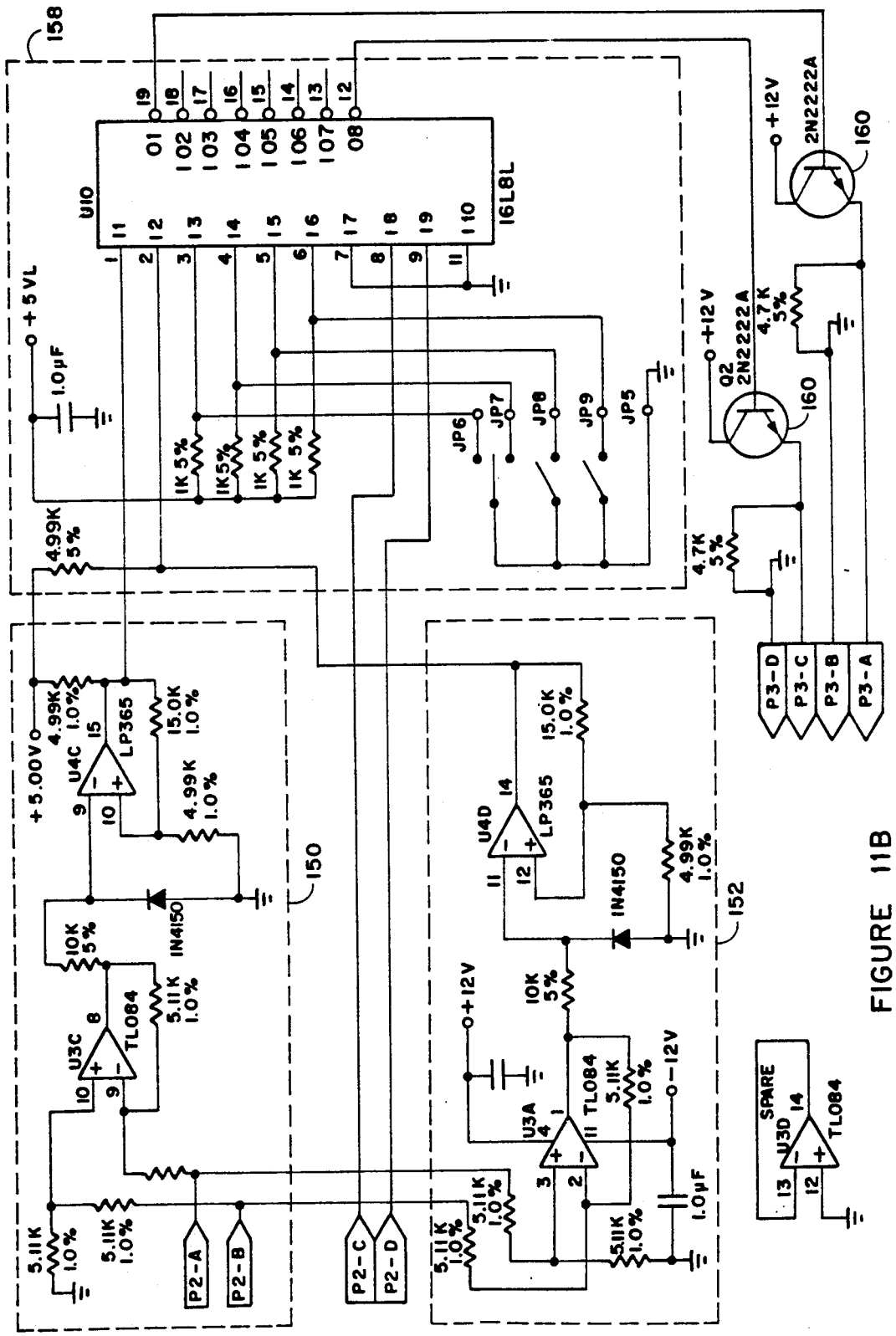
Figure 11C:
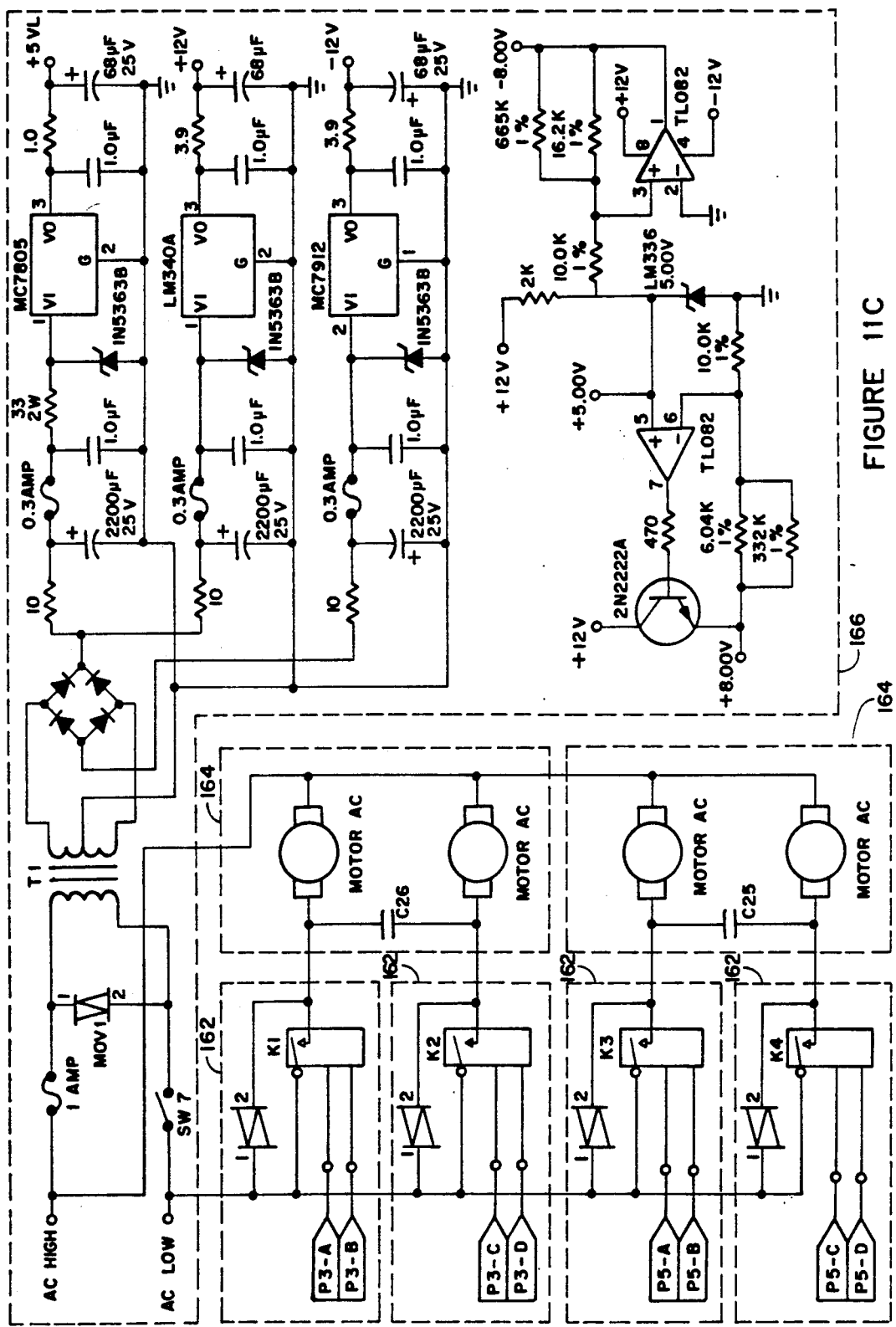

In the block diagram shown in FIG. 10, one diagram is shown of the two identical arrangements used, one each for west/east tracking and the other for up/down tracking. The system will be described with respect to the east/west sensors, remembering that the up/down system is the same. The detailed circuit diagram of FIGS. 11A through 11C provide preferred components of the circuit to be used. For convenience and clarity of discussion, the diagrams of FIGS. 10 and 11A-11C will be considered together, with the diagrams divided into functional blocks.

Signals enter the diagrams shown in FIGS. 10 and 11A from the west and east sensors 18. In the identical parallel network, sensors enter from the up and down sensors 18. The west signal passes through a wire 106 to sensor bias network 140 and the east signal passes through a wire 106 to sensor bias network 142. Networks 140 and 142 are resistor networks that bias the sensors and create differential voltage output. As the sensor resistor changes with changing impinging light, the two bias networks outputs generate a set of positive and negative voltages which are equal in magnitude but opposite in sign.

Blocks 144 and 146 buffer the two west and two east differential sensor and bias network outputs, respectively, and sum those differential outputs to create single ended west and east sensor outputs, with opposite signs.

Block 148 sums and amplifies the two single ended east/west sensor outputs. Since the two single ended sensor outputs are opposite in sign, the net effect of the summation in block 148 is to measure the difference between the outputs of the east and west sensors. The output here is the system pointing error of the east/west channel.

The function of block 150 is to take the pointing error output of block 148, subtract an adjustable channel offset 154 from it and apply it to a comparator with hysterisis. This comparator sets the on and off threshold of the west motor. The hysterisis characteristic of block 150 also guarantees that the west motor will not chatter at a single turn-on/turn-off point. The width of this hysterisis characteristic determines the maximum pointing error of the east/west channel, keeping this error to less than one quarter degree plus or minus. The adjustable channel offset 154 is used to remove fixed pointing errors due to electronic offsets in the channel. Examples are sensor differences, gain differentials and operational amplifier offset voltages and currents.

The function of block 152 is similar in operation to block 150, except that only turns on after loss of sun, west limit switch activation or an east slew command. Block 152 does not play any role in establishing system pointing accuracy or position. The thresholds of block 152 are set below those of block 150 so that the motor operates in only one direction.

The absolute magnitude of the single ended east and west sensor outputs are measured in block 156 and compared against an adjustable reference. When the output from either sensor exceeds the preset reference, the condition known as "loss of sun" is defined, indicating that the sun's brightness has fallen below some predetermined level. The two independent outputs from block 156, i.e., loss of west sun and loss of east sun, are used in the system's controller block 158 to determine the operating status of the controller.

Block 158 is the control logic that determines whether or not the motor is to be turned on to an east or west direction. The inputs to block 158 are the east and west motor drive commands from blocks 150 and 152, respectively, the east and west limit switches, the east and west slew switches, and the low sun detector inputs from block 156. The slew switches are used during maintenance cycles to actuate the motors for test purposes. The limit switches are placed on the tracking mount to prevent the controller from moving the panel beyond certain preset east/west mechanical limits.

Low sun detector 156 inputs indicate an insufficient light condition for the controller to operate. This condition occurs only when both sun sensors indicate a low light condition. Normally, the low sun condition would occur when the sun sets in the west. When this happens, the controller drives the tracking mechanism all the way to the east limit switch, putting it in a position to turn on in the following morning.

Emitter follower buffer 160 allows the control logic outputs to drive the motor control relays 162 directly. Relays 162 are solid state optically coupled thyristor switches used to witch alternating current voltage to motors 164. Relays 162 can be driven directly from a standard TTL logic level and require only a few milliamps to control the switching of the thyristor. Motors 164 are bi-directional alternating current motors used to power the tracking mechanism.

Block 166 represents the power supply that converts 120 volts alternating current (VAC) down to 28 VAC center-tapped. The 28 VAC is bridge rectified to produce $\pm 19$ volts direct current (VDC). The $+19$ VDC is passed through to two linear direct current regulators to produce $+12$ VDC and $+5$ VDC. The $-19$ VDC is passed through a third linear regulator to produce $-12$ VDC. In addition, there is a circuit function that produces a precision $\pm 8.00$ VDC for powering the sensor bias networks 144 and 146. This precision $\pm 8.00$ VDC is produced from a temperature compensated 5.00 volt zener reference diode that is amplified and precision trimmed up to 8.00 VDC.

Other applications, variations and ramifications of this invention will occur to those skilled in the art upon reading this disclosure. Those are intended to be included within the scope of this invention, as defined in the appended claims.

I claim:

1. A high efficiency solar boiler which comprises:

a pan having a generally flat bottom and upstanding walls;

a grid in said pan comprising a plurality of substantially parallel tubes, a water manifold connecting first ends of said tubes, a steam manifold connecting second ends of said tubes and means for introducing water into said water manifold and removing steam from said steam manifold;

a cover adapted to be secured to said upstanding walls to close said pan with a plurality of optically cylindrical lenses oriented parallel to said tubes and positioned to focus sunlight falling on said lens in a narrow line along corresponding tubes;

support means adapted to support said pan for rotation in a substantially horizontal plane and for tilting in a substantially vertical plane with the steam manifold end of the pan uppermost;

sensor means comprising two sensors, one aligned with the upper edge of said pan to measure azimuth and the other aligned with a side edge of the pan to measure altitude for detecting orientations of said cover other than perpendicular to the direction of the sun;

each of said sensors comprises a housing having two end surfaces sloping outwardly from the upper housing surface and a photocell coplanar with each end surface so that when the direction of the sun is perpendicular to said cover all of the sensors will be substantially equally exposed to the sun; and drive means for receiving signals from said sensor means and moving said pan in azimuth and altitude as necessary to return said cover to a position substantially perpendicular to the direction of the sun.

2. A high efficiency solar boiler according to claim 1 wherein said tubes are formed from copper or an allow primarily comprising copper and at least the portion of each of said tubes that receive light from said lens is coated black.

3. A high efficiency solar boiler according to claim 1 wherein each of said tubes is substantially entirely covered with high efficiency insulation except for a linear gap corresponding to the line of concentrated light directed against the tube by the corresponding lens.

4. A high efficiency solar boiler according to claim 3 wherein said gap has a width of about 0.15 inch and the width of the line of concentrated light has a width of about 0.05 inch.

5. A high efficiency solar boiler according to claim 1 wherein said tubes have internal upstanding ridges in a generally spiral pattern.

6. A high efficiency solar boiler according to claim 5 wherein said ridges have a generally rectangular cross section and are sufficient to produce a tube internal surface area about 2.6 times the tube external surface area.

7. A high efficiency solar boiler according to claim 1 wherein lenses have a flat surface on the outside and a compound cylindrical surface on the side toward said tubes.

8. A high efficiency solar boiler according to claim 7 wherein said lens have narrow flat longitudinal edges which extend into "H" shaped channels between adjacent lenses to support said lens in said cover.

9. A high efficiency solar boiler according to claim 8 wherein said lens are formed from a optically efficient plastic by extrusion.

10. A high efficiency solar boiler according to claim 1 wherein said sensor means includes electronic circuitry for comparing signals from each photo cell pair, detecting an imbalance in said signals and operating relays to direct power to said drive means to return said pan to a position where said photo cell signals are equal.

11. A high efficiency solar boiler according to claim 1 wherein said end surfaces slope at an angle of about 21.5° to a line perpendicular to the cover surface.

12. A high efficiency solar boiler according to claim 1 wherein said housings have openings at the top and bottom to allow cooling air to flow therethrough and thermal insulation material is applied between said housings and said pan.

13. A high efficiency solar boiler according to claim 1 wherein water and air traps are included in the upper and lower upstanding walls of said pan to permit limited airflow through said pan to remove excess heat while preventing the entry of moisture into said pan.

14. A high efficiency solar boiler according to claim 13 wherein each of said traps comprises an opening in the pan wall, a portion of the wall bent outwardly and downwardly adjacent to the lower edge of said opening and a strip secured to said wall above said opening and loosely covering said opening, with the lower edge of said strip bent toward said wall below said outwardly bent wall portion.

15. A high efficiency solar boiler according to claim 1 wherein said support means comprises;

a base having an upstanding circular rim;

a support structure having a plurality of wheels adapted to ride on said rim so that the support structure is rotatable relative to said base;

azimuth drive means for rotating said support structure relative to said base in response to signals from said tracking means;

an upstanding yoke on said support structure having pins adapted to enter bearings at approximately the center of the side walls of said pan so that said pan is tiltable about said pins in a substantially vertical plane; and altitude drive means for tilting said pan relative to said support in response to signals from said tracking means.

16. A high efficiency solar boiler according to claim 15 wherein said azimuth drive means comprises a first reversible servo motor for driving a wheel in driving engagement with said rim.

17. A high efficiency solar boiler according to claim 15 wherein said altitude drive means comprises:

a second reversible servo motor;

a pair of spaced pulleys connected by drive belts to a pulley on said second motor;

a pair screws rotatably connected to said pair of pulleys;

a bracket threadedly connected to each screw for movement therealong as the screw is rotated; and connecting rods connected between said brackets and said pan;

whereby rotation of said second motor causes said connecting rods to tilt said pan in a substantially vertical plane.

18. A high efficiency solar boiler which comprises:

a pan having a generally flat bottom and upstanding walls;

a grid in said pan comprising a plurality of substantially parallel tubes, a water manifold connecting first ends of said tubes, a steam manifold connecting second ends of said tubes and means for introducing water into said water manifold and removing steam from said steam manifold;

a cover adapted to be secured to said upstanding walls to close said pan with a plurality of optically cylindrical lenses oriented parallel to said tube and positioned to focus sunlight falling on said lens in a narrow line along corresponding tubes;

support means adapted to support said pan for rotation in a substantially horizontal plane and for tilting in a substantially vertical plane with the steam manifold end of the pan uppermost;

sensor means comprising two sensors, one aligned with the upper edge of said pan to measure azimuth and the other aligned with a side edge of the pan to measure altitude for detecting orientations of said cover other than perpendicular to the direction of the sun, said sensor means includes electronic circuitry for comparing signals from each photo cell pair, detecting an imbalance in said signals and operating relays to direct power to said drive means to return said pan to a position where said photo cell signals are equal; and drive means for receiving signals from said sensor means and moving said pan in azimuth and altitude as necessary to return said cover to a position substantially perpendicular to the direction of the sun.

19. A high efficiency solar boiler which comprises:

a pan having a generally flat bottom and upstanding walls;

a grid in said pan comprising a plurality of substantially parallel tubes, a water manifold connecting first ends of said tubes, a steam manifold connecting second ends of said tubes and means for introducing water into said water manifold and removing steam from said steam manifold;

a cover adapted to be secured to said upstanding walls to close said pan with a plurality of compound cancerating cylindrical lens oriented parallel to said tubes and positioned to focus sunlight falling on said lenses in a narrow line along corresponding tubes;

support means adapted to support said pan for rotation in a substantially horizontal plane and for tilting in a substantially vertical plane with the steam manifold end of the pan uppermost;

two sensor means for detecting orientations of said cover other than perpendicular to the direction of the sun, a first sensor aligned with the upper edge of said pan to measure azimuth and the second sensor aligned with a side edge of said pan to measure altitude, each of said sensors comprising a housing having two end surfaces sloping outwardly from the upper housing surface and a photocell coplanar with said end surfaces so that when the direction of the sun is perpendicular to said cover all of the sensors will be substantially equally exposed to the sun; and drive means for receiving signals from said sensor means and moving said pan in azimuth and altitude as necessary to return said cover to a position substantially perpendicular to the direction of the sun.

20. A high efficiency solar boiler according to claim 19 wherein said tubes are formed primarily from copper and at least the portion of each of said tubes that receive light from said lens is coated with an ultra black coating.

21. A high efficiency solar boiler according to claim 19 wherein each of said tubes is substantially entirely covered with high efficiency insulation except for a linear gap corresponding to the line of concentrated light directed against the tube by the corresponding lens.

22. A high efficiency solar boiler according to claim 21 wherein said gap has a width of about 0.15 inch and the width of the line of concentrated light has a width of about 0.05 inch.

23. A high efficiency solar boiler according to claim 21 wherein said tubes have internal upstanding ridges in a generally spiral pattern.

24. A high efficiency solar boiler according to claim 23 wherein said ridges have a generally rectangular cross section and are sufficient to produce a tube internal surface area about 2.6 times the tube external surface area.

25. A high efficiency solar boiler according to claim 19 wherein lenses have a flat surface on the outside and a compound concentrating cylindrical surface on the side toward said tubes.

26. A high efficiency solar boiler according to claim 25 wherein said lenses have narrow flat longitudinal edges which extend into "H" shaped channels between adjacent lenses to support said lenses in said cover.

27. A high efficiency solar boiler according to claim 26 wherein said lenses are formed from a optically efficient plastic by extrusion.

28. A high efficiency solar boiler according to claim 19 wherein said sensor means include two sensors, one aligned with the upper edge of said pan to measure azimuth and the other aligned with a side edge of said pan to measure altitude.

29. A high efficiency solar boiler according to claim 19 wherein said sensor means includes electronic circuitry for comparing signals from each photo cell pair, detecting an imbalance in said signals and operating relays to direct power to said drive means to return said pan to a position where said photo cell signals are equal.

30. A high efficiency solar boiler according to claim 29 wherein said circuitry includes means for receiving differential voltage signals from each pair of photo cells, a resistance biasing network for differentially balancing and buffering the voltage signals, means for subtracting the two differential voltage signals from each sensor and producing a single ended voltage output representing the level of solar exposure on the sensor, means for offsetting the single ended voltage to compensate for alignment and resistance characteristic differences between the sensors, means for providing system deadband width to establish system pointing accuracy, and relays for sending drive means operating system signals in response to the sensor signals.

31. A high efficiency solar boiler according to claim 19 wherein said end surfaces slope at an angle of about 21.5° to a line perpendicular to the cover surface.

32. A high efficiency solar boiler according to claim 19 wherein said housings have openings at the top and bottom to allow cooling air to flow therethrough and thermal insulation material is applied between said housings and said pan.

33. A high efficiency solar boiler according to claim 19 wherein water and air traps are included in the upper and lower upstanding walls of said pan to permit limited airflow through said pan to remove excess heat while preventing the entry of moisture into said pan.

34. A high efficiency solar boiler according to claim 33 wherein each of said traps comprises an opening in the pan wall, a portion of the wall bent outwardly and downwardly adjacent to the lower edge of said opening and a strip secured to said wall above said opening and partially covering said opening, with the lower edge of said strip bent slightly toward said wall below said outwardly bent wall portion.

35. A high efficiency solar boiler according to claim 19 wherein said support means comprises;
 a base having an upstanding circular rim;
 a support structure having a plurality of wheels adapted to ride on said rim so that the support structure is rotatable relative to said base;
 azimuth drive means for rotating said support structure relative to said base in response to signals from said tracking means;
 an upstanding yoke on said support structure having pins adapted to enter bearings at approximately the center of the side walls of said pan so that said pan is tiltable about said pins in a substantially vertical plane; and
 altitude drive means for tilting said pan relative to said support in response to signals from said tracking means.

36. A high efficiency solar boiler according to claim 35 wherein said azimuth drive means comprises a first reversible servo motor for driving a wheel in driving engagement with said rim.

37. A high efficiency solar boiler according to claim 35 wherein said altitude drive means comprises:
 a second reversible servo motor;
 a pair of spaced pulleys connected by drive belts to a pulley on said second motor;
 a pair screws rotatably connected to said pair of pulleys;
 a bracket threadedly connected to each screw for movement therealong as the screw is rotated; and
 connecting rods connected between said brackets and said pan;
 whereby rotation of said second motor causes said connecting rods to tilt said pan in a substantially vertical plane.

* * * * *